United States Patent [19]

Konishi

[11] Patent Number: 5,381,294

[45] Date of Patent: Jan. 10, 1995

[54] DEVICE FOR PROTECTING POWER SUPPLY CIRCUIT

[75] Inventor: Hirofumi Konishi, Takatsuki, Japan

[73] Assignee: Matsushita Electric Industrial Co., Ltd., Osaka, Japan

[21] Appl. No.: 940,321

[22] Filed: Sep. 3, 1992

[30] Foreign Application Priority Data

Sep. 10, 1991 [JP] Japan .................. 3-229962

[51] Int. Cl.⁶ .............................................. H02H 7/10
[52] U.S. Cl. ......................................... 361/18; 361/92; 361/45
[58] Field of Search ...................... 361/45, 56, 92, 18

[56] References Cited

U.S. PATENT DOCUMENTS 4,979,067 12/1990 Foley ..................... 361/56

FOREIGN PATENT DOCUMENTS

| | | |
|---|---|---|
| 61-66561 | 4/1986 | Japan . |
| 61-88766 | 10/1986 | Japan . |
| 62-233925 | 10/1987 | Japan . |
| 62-252678 | 11/1987 | Japan . |
| 1402386 | 8/1975 | United Kingdom . |
| 2191505 | 12/1987 | United Kingdom . |
| 2243963 | 11/1991 | United Kingdom . |

*Primary Examiner*—Todd E. DeBoer
*Attorney, Agent, or Firm*—Stevens, Davis, Miller & Mosher

[57] ABSTRACT

A device for protecting a power supply which is preferable for television receivers, etc. is disclosed. A diode is connected between a secondary anode of a power supply voltage feedback control photocoupler and a load of the power supply. When a voltage on the load is lowered due to an abnormality such as short-circuiting of the load, a control current for said power supply voltage feedback control photocoupler is caused to flow to the load via said diode to interrupt the control current for stopping the operation of the power supply. Overheating and/or breaking of components due to eddy current can be prevented on occurrence of an abnormality such as short-circuiting.

14 Claims, 2 Drawing Sheets

DEVICE FOR PROTECTING POWER SUPPLY CIRCUIT

BACKGROUND OF THE INVENTION

1. Field of the Invention

The present invention relates to a power supply circuit protecting device and in particular to a device for protecting a power supply circuit which prevents parts of the power supply circuit from overheating or burning by stopping the oscillation of the power supply circuit when an abnormality such as short-circuiting between terminals of a power transformer and of a load circuit in the secondary side of the power supply circuit occurs and is excellent in safety.

2. Prior Art

Recently, switching type power sources have been predominantly used in consumer's electronic devices such as television receiver sets and simultaneously an improvement in the safety of the power sources has been demanded. Accordingly, various devices for protecting a switching power supply circuit in a television receiver, etc. have been proposed.

A prior art device for protecting a power supply circuit is shown in FIG. 2. A reference numeral 1 denotes an a.c. power inlet; 2 an a.c. fuse; 3 a full-wave rectifying circuit; 4 a power supply output control means; 5 a power transformer; 6 a photo-coupler for power supply voltage feedback control; 7 a voltage detection error amplifier; 8 an activating resistor; 9 an activating diode; 10 a current detecting resistor; 11 and 12 resistors; 13 through 16 rectifying diodes; 17 through 21 smoothing capacitors. The outputs of the voltage lines are connected to loads 100, 101, 102, respectively.

Operation of the thus formed prior art power supply protecting device will be described.

When a.c. voltage is applied to the power supply circuit, the power output control means is activated through the activating resistor 8 so that a voltage is output to the secondary side of the transformer 5. A change in voltage in the secondary side (140 voltage line) of the power transformer is detected by the voltage control error amplifier 7 and is converted into a change in current. The converted current change is fed back to a control terminal of the power supply output control means 4 to control an output voltage.

Operation when a circuit across the terminals S4 and S5 (10 V and the ground) of the power transformer 5 is shorted will now be described.

The winding between S4 and S5 is wound in turns of 2T. A short-circuiting current flows through the winding between S4 and S5 when the circuit between S4 and S5 is shorted so that the temperature of the transformer is elevated. Since an increase in current flowing through the primary winding at this time is relatively low (since the secondary winding is in turns of 2T), the power output control means 4 continues to normally work. If this condition continues for a long period of time, the temperature of the winding between S4 and S5 is considerably elevated and the winding is then brought into contact with the winding between S3 and S5. Since the current flowing through the primary side is considerably increased at this time, the a.c. fuse 2 is fused or a circuit between the drain and the source of a MOSFET in the power output control means 4 is opened so that the power supply circuit is turned off.

There remains a problem in reliability of the dielectric resistance across the primary and secondary windings of the power transformer since heat generation of the power transformer 5 continues for a long period of time. There is also a problem in that a stress is applied to the power output control means 4, causing a breakdown thereof.

SUMMARY OF THE INVENTION

The present invention was made under such circumstances. It is, therefore, an object of the present invention to provide a device of protecting a power supply, which remarkably enhances the safety of the power supply circuit.

In order to accomplish the above mentioned object, the device for protecting the power supply circuit of the present invention includes a diode which couples a secondary side anode of a power supply voltage feedback control photocoupler 6 with a power supply load. A control current for the voltage control photocoupler 6 is caused to flow to the load via the diode to cut off the control current to bring the power supply circuit into an uncontrolled state when the voltage of the load is lowered on occurrence of an abnormality. The voltage across a winding of a power transformer is elevated to stop the oscillation of the power supply output control HIC.

In accordance with the above mentioned structure of the present invention, the oscillation of the power supply circuit is stopped when a circuit between terminals of the power transformer or the load circuit is short-circuited to prevent parts from over-heating and breaking.

DESCRIPTION OF A PREFERRED EMBODIMENT

Figure 1:
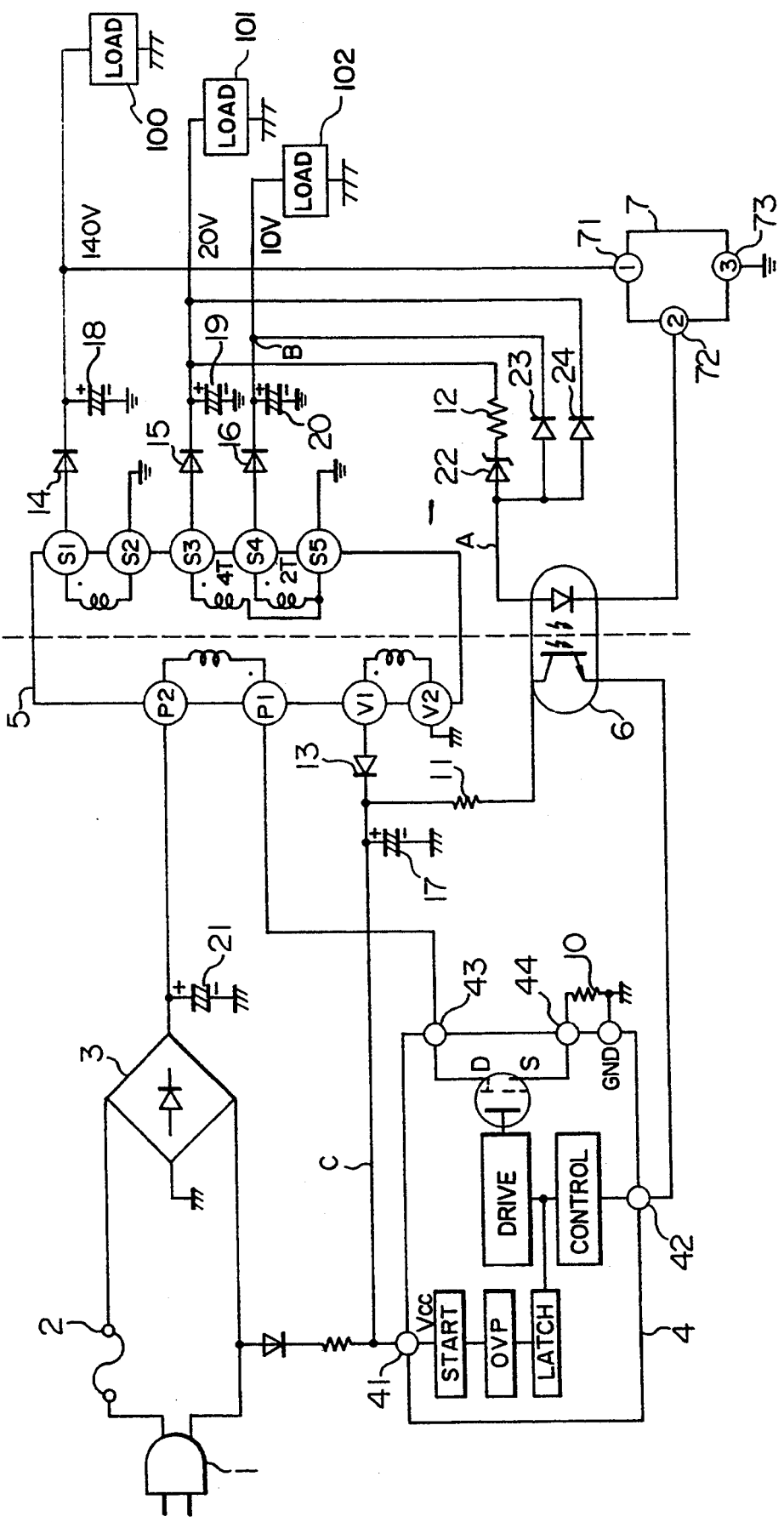
FIG. 1 is a circuit diagram showing an embodiment of a device for protecting a power supply of the present invention.
Figure 2:
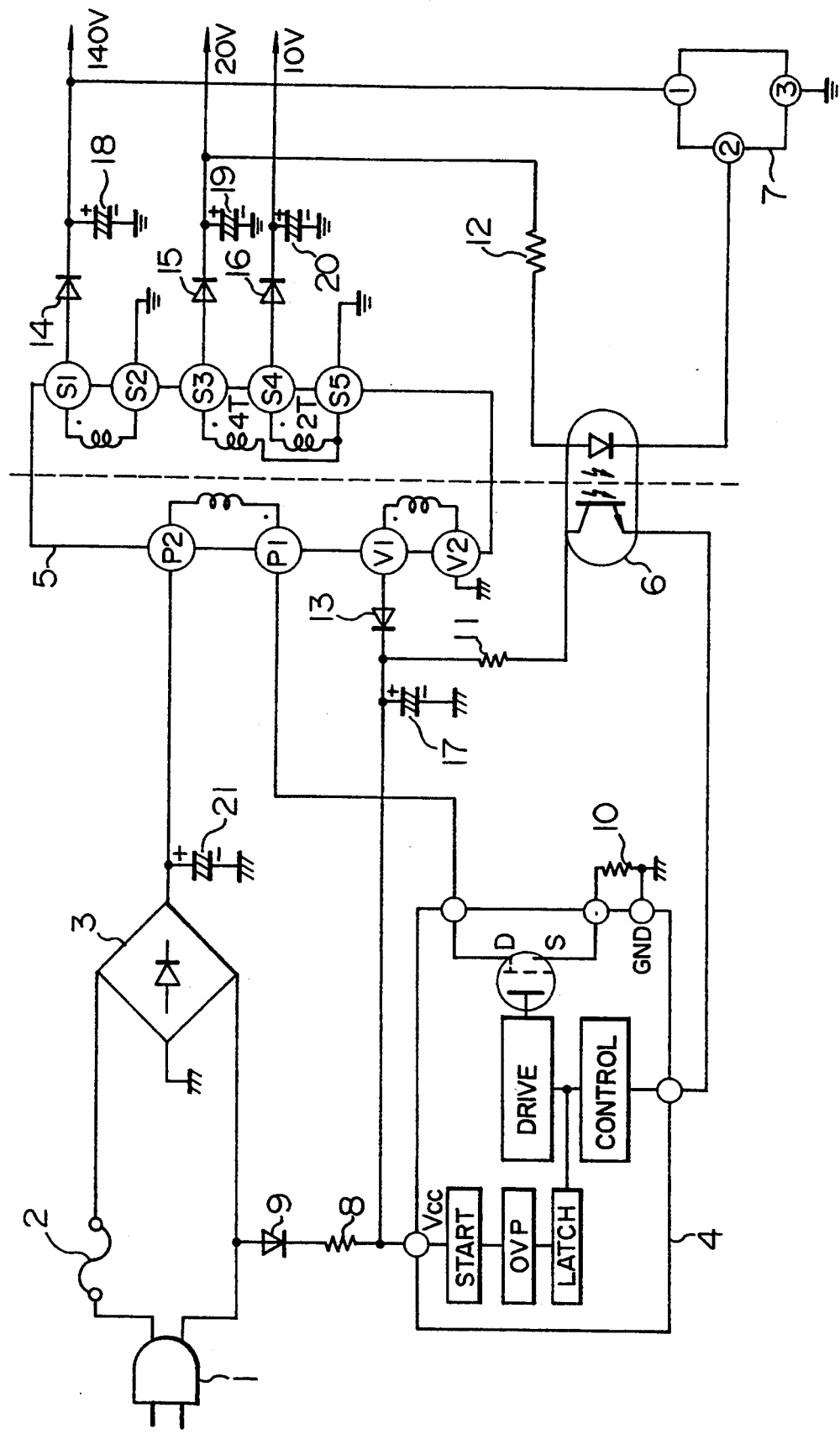
FIG. 2 is a circuit diagram showing a prior art device.

An embodiment of a device for protecting a power supply of the present invention will be described with reference to FIG. 1. A reference numeral 1 denotes an a.c. power inlet; 2 an a.c. fuse; 3 a full-wave rectifying circuit; 4 a power supply output control means; 5 a power transformer; 6 a photocoupler for power supply voltage feedback control; 7 a voltage detection error amplifier; 8 an activating resistor; 9 an activating diode; 10 a current detecting resistor; 11 and 12 resistors; 13 through 16 rectifying diodes; 17 through 21 smoothing capacitors; 22 constant voltage diode; 23 and 24 control current bypass diodes.

Operation of the thus formed power supply protecting device will be described.

When a.c. voltage is applied to the power supply circuit, the power output control means is activated through the activating resistor 8 so that a voltage is output to the secondary side of the power transformer 5. A change in voltage in the secondary side (140 voltage line) of the power transformer is detected by the voltage control error amplifier 7 and is converted into a change in current. The converted current change is fed back to a control terminal of the power supply output control means 4 to control an output voltage.

Operation when a circuit across the terminals S4 and 5 (10 V and the ground) of the power transformer 5 is shorted will now be described.

The voltage on the anode (point A) of the voltage control photocoupler is usually 9 to 10 volts since it is applied thereto from a 20 volt line via the resistor 12 and a constant voltage diode 22. The diode 23 for bypassing the control current is normally conductive since it is inserted between the point A and a 10 volt line (point B).

When a circuit between terminals S4 and S5 is short-circuited, the control current bypass diode 23 is rendered conductive since the voltage on the 10 V line is changed to about 0 volt. At this time, the power supply is brought into an uncontrolled state since the control current will not flow through the control current photocoupler. The voltage across the terminals V1 and V2 of a winding for applying a bias voltage to the power supply output control means 4 abruptly increases. The bias voltage for the power supply output control means 4 on point C is normally 15 to 18 volts. When this voltage increases to about 26 volts, the control current is interrupted to stop the oscillation of the power supply. In other words, the power supply is brought into an uncontrolled state by the short-circuiting of the terminals S4 to S5 so that the bias voltage is abruptly increased to stop the oscillation of the power supply. The output voltage becomes 0 volt. In such a manner, overheating of the power transformer 5 and the breaking of the power supply output control HIC 4 can be prevented.

In accordance with the power supply protecting device of the present invention, overheating and/or breaking of components can be prevented by stopping the oscillation of the power supply when an abnormality such as short-circuiting between terminals of the power transformer or a load circuit occurs.

What is claimed is:

1. A device for protecting a power supply, comprising:
   a power transformer including a primary first winding having a first end which is connected to an output of a full-wave rectifier of an a.c. voltage;
   a power supply output control means including a switching output unit connected to a second end of the primary first winding of said power transformer and having a power supply voltage input which is connected to an a.c. voltage via a first diode;
   a primary second winding having a first end connected to the voltage input of said power supply output control means via a second diode and a second end which is grounded;
   a power supply voltage feedback control photocoupler disposed between the primary second winding and a first secondary winding of said power transformer;
   a third diode having an anode connected to said power supply voltage feedback control photocoupler and a cathode connected to an output terminal of the first secondary winding of said power transformer; and
   a voltage control error amplifier disposed between the secondary winding of said power transformer and the ground;
   said power supply voltage feedback control photocoupler having an emitter connected to a control terminal of said power supply output control means, a collector connected to said power voltage input, a cathode connected to a load voltage control terminal of said voltage control error amplifier, and an anode connected to said anode of said third diode.

2. A method of protecting a power supply using a transformer including primary winding and a secondary winding, said method comprising:
   (a) providing a diode having (i) an anode connected to an anode of a power supply voltage feedback control photocoupler disposed between the primary winding and the secondary winding of the power transformer, and (ii) a cathode connected to a load circuit of the power supply; and
   (b) bypassing a control current of said power supply voltage feedback control photocoupler to the load via said diode to interrupt the control current for stopping the operation of the power supply when the voltage on the load circuit is lowered due to short-circuiting of the load circuit.

3. A device for protecting a power supply, comprising:
   a transformer having a primary side for receiving an input voltage and a secondary side for supplying an output to a load;
   a power supply output controller including a switching unit connected to the primary side of said transformer, an input for receiving said input voltage, and a control terminal for receiving a control signal, said power supply output controller controlling said switching unit in accordance with said control signal;
   a diode having a first end connected to said secondary side of said transformer and a second end; and
   a feedback controller having a first end connected to said control terminal and a second end connected to said second end of said diode.

4. A device according to claim 3, wherein said diode is a zener diode.

5. A device according to claim 3, wherein said first end of said diode is a cathode of said diode and said second end of said diode is an anode of said diode.

6. A device according to claim 3, wherein said feedback controller is a photocoupler.

7. A device according to claim 6, wherein said photocoupler comprises an emitter connected to said control terminal, a collector connected to said primary side of said transformer, and an anode connected to said first end of said diode.

8. A device according to claim 3, further comprising a voltage control error amplifier disposed between the secondary side of said transformer and ground, and having a terminal connected to said feedback controller.

9. A device according to claim 3, wherein said secondary side of said transformer has a plurality of windings for providing a plurality of different voltage outputs, and said diode is connected between a first one of said voltage outputs and said feedback controller.

10. A device according to claim 9, further comprising a plurality of diodes respectively connected between remaining ones of said voltage outputs and said feedback controller.

11. A device according to claim 10, wherein said plurality of diodes are connected such that their anodes are connected to said feedback controller and their cathodes are connected to respective ones of said voltage outputs.

12. A device according to claim 3, wherein said switching unit comprises a FET.

13. A device according to claim 1, wherein said power transformer comprises a plurality of secondary windings, each having an output terminal, and said third diode is connected to the output of the first secondary winding;

said device further comprising a plurality of control current bypass diodes respectively connected between remaining ones of the output terminals of said secondary windings and said power supply voltage feedback control photocoupler.

14. A method according to claim 2, wherein said primary winding includes a first primary winding and a second primary winding, said method further comprises providing a power supply voltage feedback control photocoupler between the second primary winding and the secondary winding of the power transformer, and said step (b) comprises connecting the anode of the diode to an anode of said photocoupler.

* * * * *